(12) United States Patent
Harms et al.

(10) Patent No.: US 7,258,330 B2
(45) Date of Patent: Aug. 21, 2007

(54) AIR SPRING DEVICE

(75) Inventors: Ingo Harms, Hamburg (DE); Peter Kobs, Hamburg (DE); Michael Weber, Buchholz (DE)

(73) Assignee: Carl Freudenberg KG (DE)

( * ) Notice: Subject to any disclaimer, the term of this patent is extended or adjusted under 35 U.S.C. 154(b) by 68 days.

(21) Appl. No.: 11/119,058

(22) Filed: Apr. 29, 2005

(65) Prior Publication Data

US 2005/0253316 A1 Nov. 17, 2005

(30) Foreign Application Priority Data

May 13, 2004 (DE) ...................... 10 2004 023 561

(51) Int. Cl.
*F16F 9/04* (2006.01)
*F16J 3/04* (2006.01)

(52) U.S. Cl. .................................. 267/64.27; 267/64.23

(58) Field of Classification Search ... 267/64.21–64.27
See application file for complete search history.

(56) References Cited

U.S. PATENT DOCUMENTS

| | | | |
|---|---|---|---|
| 3,399,882 A | 9/1968 | Hausman | |
| 5,180,146 A * | 1/1993 | Schneider et al. | 267/64.27 |
| 5,413,316 A * | 5/1995 | Easter | 267/64.24 |
| 6,250,613 B1 * | 6/2001 | Koeske et al. | 267/66 |
| 6,431,529 B1 * | 8/2002 | Maeda | 267/64.24 |
| 6,805,359 B2 * | 10/2004 | Neuhaus et al. | 277/576 |
| 6,843,472 B2 * | 1/2005 | Henry et al. | 267/64.24 |
| 2002/0153646 A1* | 10/2002 | Weitzenhof | 267/64.27 |
| 2004/0068846 A1* | 4/2004 | Karlinger | 24/20 EE |

FOREIGN PATENT DOCUMENTS

| | | |
|---|---|---|
| DE | 1816597 | 8/1960 |
| DE | 1245656 | 7/1967 |
| DE | 1430597 | 3/1969 |
| DE | 2904522 | 8/1980 |
| DE | 4021746 | 1/1992 |
| DE | 4445902 | 6/1996 |
| DE | 19753637 | 6/1998 |
| DE | 69225116 | 8/1998 |
| DE | 19952919 | 8/2000 |
| DE | 10041927 | 3/2001 |
| DE | 10103493 | 8/2001 |
| DE | 19935402 | 8/2001 |
| DE | 10050028 | 10/2001 |
| DE | 10215048 | 11/2002 |
| DE | 10225986 | 12/2003 |
| EP | 1015790 | 7/2000 |
| GB | 1071931 | 2/1965 |
| JP | 2004-34871 | 5/2004 |

* cited by examiner

*Primary Examiner*—Chris Schwartz
(74) *Attorney, Agent, or Firm*—Harness, Dickey & Pierce, P.L.C.

(57) ABSTRACT

An air spring device characterized in that a cover encloses a pot-shaped basic component and a separate connecting component with a first connecting region for one end of a bellows. The basic component and the connecting component are in direct contact with one another. In a region of the cover there is also provided, as a separate component, a holder for a protective collar. The holder is in direct contact with the connecting component. A common tightening ring, the two ends of which are fastened to each other by a connection, hold together, from the outside and in sealing manner, the basic component, the connecting component, and the protective collar holder.

19 Claims, 3 Drawing Sheets

AIR SPRING DEVICE

CROSS-REFERENCE TO RELATED APPLICATIONS

This application claims the benefit of German Patent Application 10 2004 023 561.9, filed May 13, 2004. The disclosure of the above application is incorporated herein by reference.

FIELD OF THE INVENTION

The present invention relates to an air spring device consisting of at least one air spring bellows made of an elastomeric material that has two ends, the bellows encloses a variable-volume air chamber with formation of a loop; a cover with a first connection region for one end of the bellows; a rolling piston provided with a second connection region for the other end of the bellows, and also with a rolling surface for the loop; and a protective collar for the air spring bellows.

DESCRIPTION OF THE RELATED ART

Air springs are widely used in motor vehicle construction, particularly in the passenger vehicle sector. In this respect, the reader is referred to publications DE 18 16 597 U1 and DE 102 25 986 A1.

An air spring device can be fitted with a vibration damper (impact damper). Such an air spring device is also referred to as an air spring leg. As far as the prior art in this field is concerned, the reader is referred to publication DE 197 53 637 A1 in particular.

Within the framework of further development, the object of the invention is to configure the connection sector of the air spring bellows and the protective collar so that, if mounting space is available, an inexpensive and safe connection of the joining components is ensured.

SUMMARY OF THE INVENTION

The above objective is reached in that a cover encloses a pot-shaped basic component and a separate connecting component with a first connection region for one end of the bellows, the basic component and the connecting component being in direct contact with one another. In the region of the cover, there is present, also as a separate component, a holder for the protective collar which is in direct contact with the connecting component. A common tightening ring the two ends of which are fastened to each other by means of a connection. The ring holds together, from the outside and in sealing manner, the basic component, the connecting component, and the protective collar holder.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will now be explained on exemplary embodiments by reference to schematic drawings in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
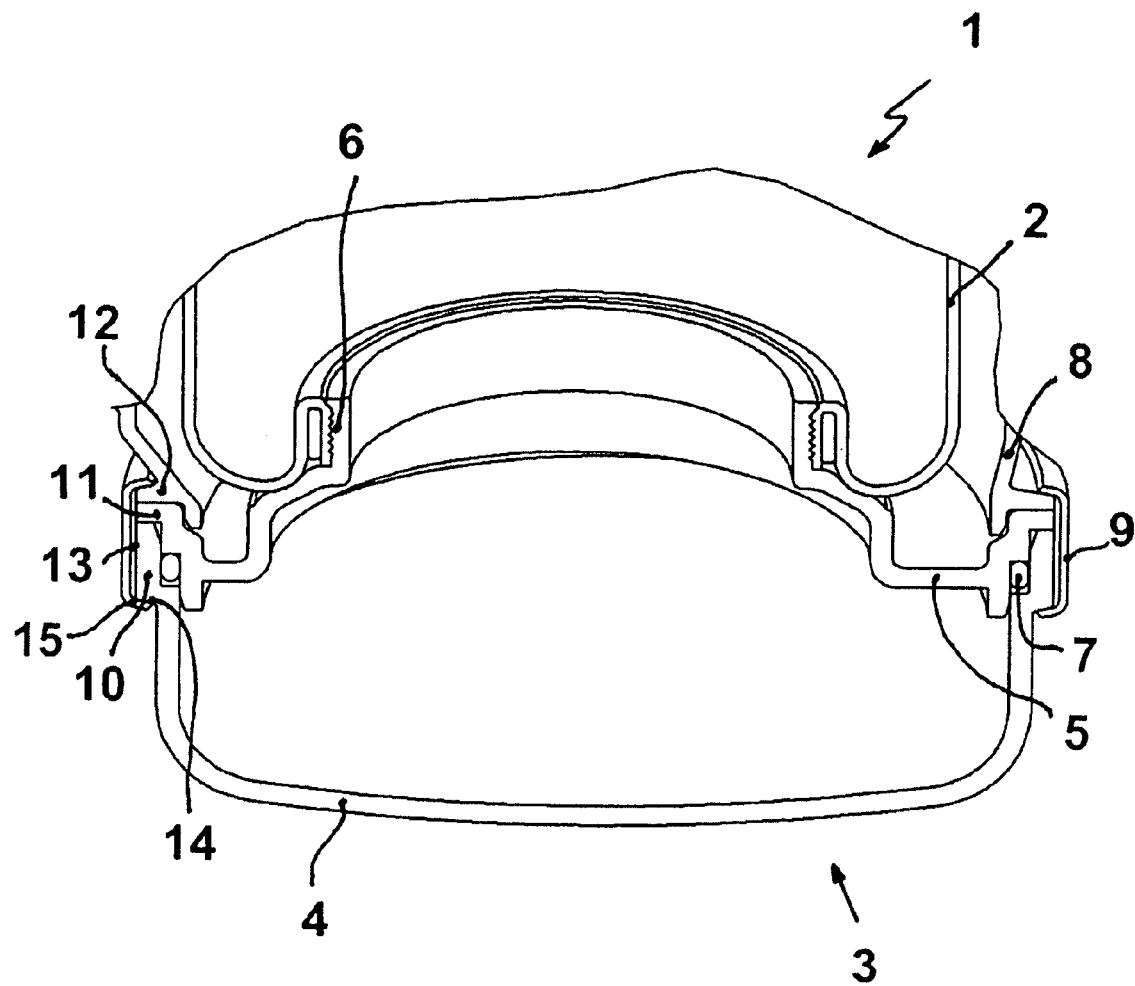
FIG. 1 shows the closer region of the cover.

FIG. 1 shows an air spring device 1 with an air spring bellows 2 and a cover 3. The air spring bellows 2, made of an elastomeric material, is in most cases provided with an embedded reinforcing fabric, here in particular in the form of a cross-ply bellows (see, e.g., DE 29 04 522 A1).

The cover 3 which, in particular, is designed as a pressure vessel, comprises a pot-shaped basic component 4 and a separate connecting component 5 with a first connecting region 6 for the one end of the bellows. The basic component 4 and the connecting component 6 are in direct contact with one another. Between the basic component and the connecting component is disposed a sealing ring 7 made of a polymeric material. In particular, the sealing ring 7 consists of an elastomeric material or a thermoplastic elastomer (TPE).

Here, the connecting component 5 is made as a single part (one piece). A multipart design, however, is also possible particularly with an integrated elastomeric bearing.

In the region of the cover 3 there is disposed, also as a separate component, a holder 8 for the protective collar. The holder 8 is directly linked with the connecting component 5.

A common metallic tightening ring 9 holds together, from the outside and in sealing manner, the basic component 4, the connecting component 5, and the protective collar holder 8. In the region of the tightening ring 9, the basic component 4, connecting component 5, and protective collar holder 8 are provided with flanged extensions 10, 11 and 12 which have a common outer surface 13 running flush with the inside of the tightening ring 9. Moreover, the basic component 4 and the protective collar holder 8 each have an undercut 14, with prongs 15 of the tightening ring 9 enclosing each undercut 14.

The basic component 4, and/or connecting component 5, and/or protective collar holder 8, and in particular all three of these components, are made of a plastic material. The plastic material is a polymer with high impact resistance, preferably based on a polyamide or a polyester. Moreover, the plastic material can also be reinforced, particularly with a fabric or with fibers (glass fiber reinforcement).

Figure 2:
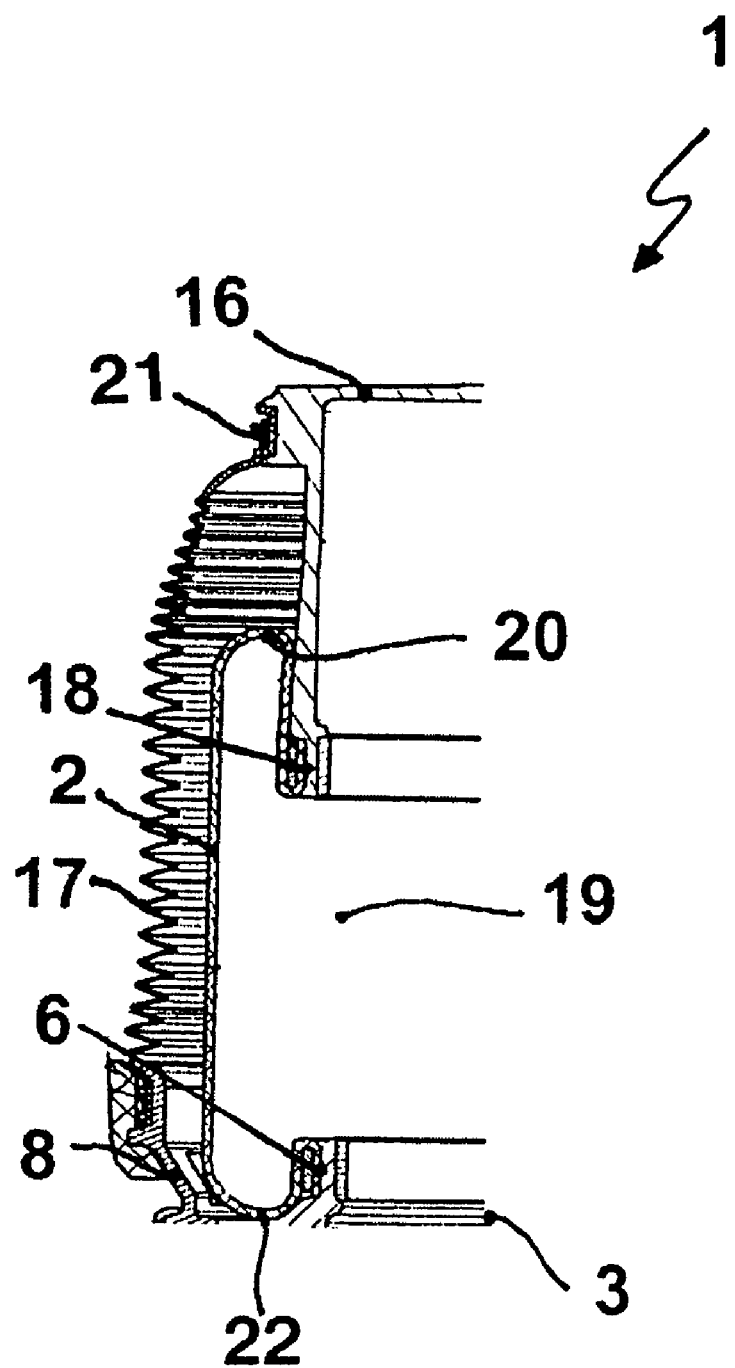
FIG. 2 shows the course of the protective collar from the cover to the rolling piston.

FIG. 2 shows the air spring device 1 with the essential basic components, namely the air spring bellows 2, cover 3, rolling piston 16, and protective collar 17. Within the two connecting regions 6 and 18, the two ends of the bellows 2 are fastened to the cover 3 or to the rolling piston 16, particularly with clamping rings. An air chamber 19 of variable volume is formed in this manner. During spring compression, a loop 20 is formed (dynamic region of the air spring bellows) which can glide along the rolling surface. In the region of the cover 3, there is formed a second loop 22 which can roll only to a limited extent compared to the loop 20. In regard to the double loop construction, the reader is referred, in particular, to publications EP 1 015 790 B1 and DE 101 03 493 A1. A loop-free construction in the region of the cover is also possible.

The protective collar 17, which in most cases consists of a polymeric material (elastomer, thermoplast, TPE), extends from the protective collar holder 8 in the region of the cover 3 to an end region .21 of the rolling piston 16. The collar 17 ends are fastened, for example, with clamping rings.

One of the basic components, namely the cover 3 or the rolling piston 16, is permanently fastened to the motor vehicle body. The other component is connected firmly with an axle suspension link (chassis link). In the exemplary embodiment according to FIGS. 1 and 2, the cover 3 as a lower component is connected with the axle suspension link whereas the rolling piston 16 as an upper component is connected with the motor vehicle body.

FIGS. 3 to 7 show advantageous linking variants of the tightening ring 9 at the two ends thereof, A and B.

Figures 3, 4, 5:
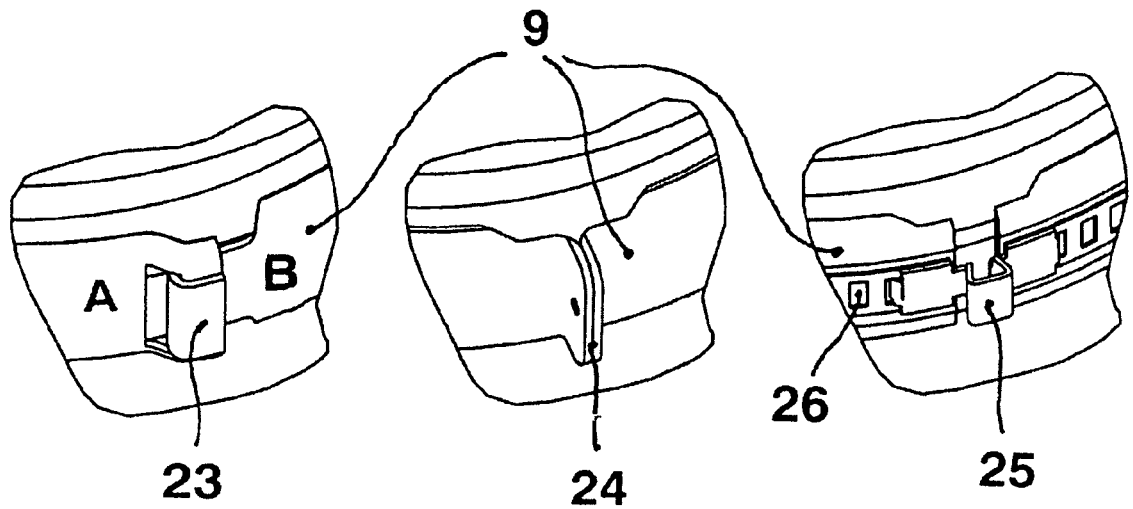
FIG. 3 shows a tightening ring with an interlocking connection.
FIG. 4 shows a tightening ring with a welded connection.
FIG. 5 shows a tightening ring with a clip connection.

More specifically, FIG. 3 is directed to a configuration where the two ends A and B of the tightening ring 9 are linked by an interlocking connection 23.

As shown in FIG. 4, the ends of the tightening ring 9 may be connected by a welded connection.

In FIG. 5, the ends of the tightening ring 9 are connected by a clip connection, with a prong-shaped clip end 25 engaging with openings 26 which are arranged in a row.

Figures 6, 7:
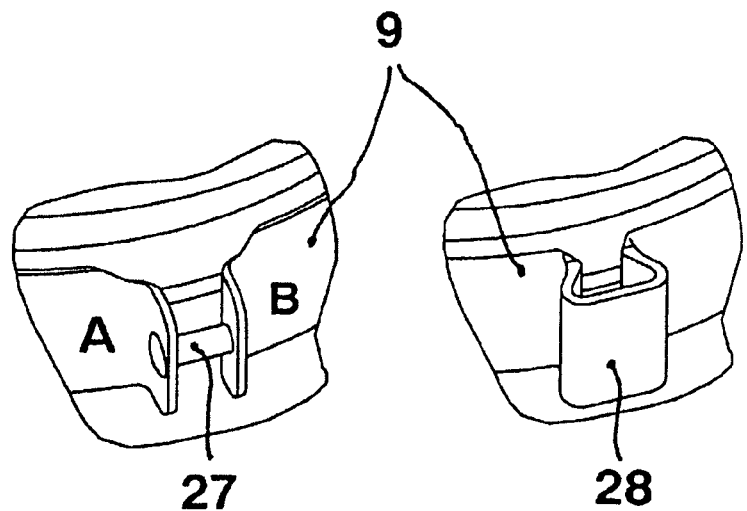
FIG. 6 shows a tightening ring with a rivet connection.
FIG. 7 shows a tightening ring with a deformable connection overhang.

FIG. 6 depict an embodiment wherein the ends A and B of the clamping ring 9 are connected by a rivet connection 27.

FIG. 7 shows another embodiment wherein the ends of the tightening ring 9 are connected by a deformable, endless, closed connection overhang 28. In this regard, the connection overhang 28 is preferably bent.

Preferably, the tightening rings 9 shown in FIGS. 3–7 are formed of a metal.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air spring device comprising:
    at least one air spring bellows made of an elastomeric material and having two ends, said bellows enclosing a variable-volume air chamber;
    a cover with a first connection region for one end of the bellows;
    a rolling piston provided with a second connection region for the other end of the bellows; and
    a protective collar for the air spring bellows;
    wherein the cover encloses a pot-shaped basic component and a separate connecting component with a first connection region for one end of the bellows, the basic component and the connecting component being in direct contact with one another;
    a holder for the protective collar provided in a region of the cover, the holder being in direct contact with the connecting component; and
    a common tightening ring, two ends of the common tightening ring being fastened to each other by a connection, the ring holding together, from the outside and in a sealing manner, the basic component, the connecting component, and the protective collar holder.

2. The air spring device as defined in claim 1, wherein at least one of the basic component, the connecting component, and the holder for the protective collar are comprised of a plastic material.

3. The air spring device as defined in claim 2, wherein the plastic material is a high impact resistant polymer with high impact resistance.

4. The air spring device as defined in claim 3, wherein the high impact resistant polymer is polyamide or polyester.

5. The air spring device as defined in claim 2, wherein the plastic material is reinforced.

6. The air spring device as defined in claim 5, wherein the plastic material is reinforced with fabric or glass fibers.

7. The air spring device as defined in claim 1, wherein the basic component, the connecting component, and the holder for the protective collar are provided in the region of a clamping ring with flanged extensions, the clamping ring having a common outer surface that runs flush with an inside surface of the tightening ring.

8. The air spring device as defined in claim 7, wherein both the basic component and the holder for the protective collar have an undercut; and
    prongs of the tightening ring enclose each undercut.

9. The air spring device as defined in claim 7, wherein the ends of the clamping ring are connected by a deformable, endless, closed connection overhang.

10. The air spring device as defined in claim 9, wherein the connection overhang is bent.

11. The air spring device as defined in claim 7, wherein the ends of the clamping ring are linked by an interlocking connection.

12. The air spring device as defined in claim 7, wherein the ends of the clamping ring are connected by a welded connection.

13. The air spring device as defined in claim 7, wherein the ends of the clamping ring are connected by a clip connection, with a prong-shaped clip end engaging with openings which are arranged in a row.

14. The air spring device as defined in claim 7, wherein the ends of the clamping ring are connected by a rivet connection.

15. The air spring device as defined in claim 7, wherein the clamping ring consists of a metal.

16. The air spring device as defined in claim 1, wherein a sealing ring made of a polymeric material is disposed between the basic component and the connecting component.

17. The air spring device as defined in claim 16, wherein the sealing ring consists of an elastomeric material or a thermoplastic elastomer.

18. The air spring device as defined in claim 1, wherein the connecting component and the first connecting region are made of a single part or of multiple parts, with an integrated elastomeric bearing.

19. The air spring device as defined in claim 1, wherein said bellows includes a loop portion at said other end, said loop portion of the bellows overlapping at least a portion of the remainder of the bellows, and wherein said piston includes a rolling portion thereon, said rolling portion of said piston being engageable by said loop portion of the bellows.

* * * * *